UNITED STATES PATENT OFFICE.

IGNACY POMORSKI, OF ERIE, PENNSYLVANIA.

PROCESS FOR MANUFACTURING CARDBOARD.

1,367,279.  Specification of Letters Patent.  Patented Feb. 1, 1921.

No Drawing.  Application filed October 22, 1919. Serial No. 332,527.

*To all whom it may concern:*

Be it known that I, IGNACY POMORSKI, residing at Erie, county of Erie, and State of Pennsylvania, have invented certain new and useful Improvements in Processes for Manufacturing Cardboard, of which the following is a specification.

The present invention relates to improvements in processes of making paper, especially writing paper.

It is the object of my invention to enable the making by hand of an excellent writing paper of a compact web from an inexpensive material by a very simple mechanical process, thus saving expense and labor.

To accomplish the result, I use plants growing in the water, as for instance water weeds, water plantains, or other aquatic plants which I boil for about four hours in the presence of a coloring material if the production of colored paper is desired. The pulp resulting from the boiling process, I subject to pressure between two pressure rollers for removing the water therefrom and to roll the pulp into a compact flat sheet which is then cut into sheets of various sizes, according to the use for which it is intended.

If a paper of a very fine quality is to be produced, the stalks, skins and roots of the plants must be removed from the mass before the same is subjected to the boiling process, and in fact the quality of the paper produced will depend on the degree to which such roots, stalks, and skins have been removed from the mass. If it is desired to produce a paper of a very fine quality, the mass, after the boiling process, is subjected to washing and bleaching and thereafter, is again subjected for the action of two or more pressure rollers in order to form an endless web which is then cut into sheets of the desired sizes.

What I claim is—

1. The process of making paper consisting in boiling aquatic plants, adding coloring matter to the boiling mass, and finally subjecting the pulp resulting from the boiling to calendering.

2. The process of making paper consisting in boiling aquatic plants, adding coloring matter to the boiling mass, removing the skins, stalks, and roots from the plants, and finally subjecting the resulting pulp to calendering.

3. The process of making paper consisting in boiling water weeds for four hours, adding coloring matter to the boiling mass, removing the stalks, roots, and skins, from said mass, and finally calendering the pulp, and cutting the resulting web into pieces of various sizes.

4. The process of making paper consisting in boiling aquatic plants, adding coloring matter to the mass, removing the stalks, roots and skins from said mass, washing the resulting pulp, bleaching the same, and finally calendering the pulp and cutting the resulting web into pieces of various sizes.

In testimony whereof I have affixed my signature.

IGNACY POMORSKI.